G. E. M. GUY-BERNARD.
THRESHING MACHINE.
APPLICATION FILED MAY 13, 1909.
964,966.
Patented July 19, 1910.
2 SHEETS—SHEET 1.
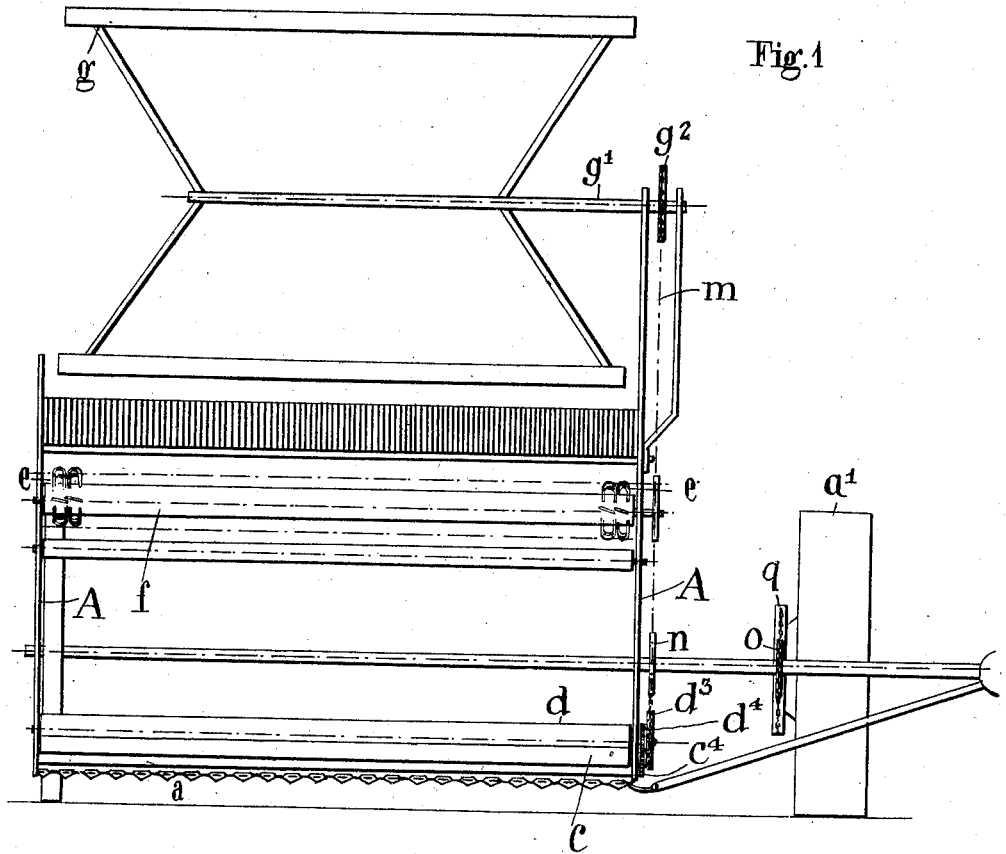
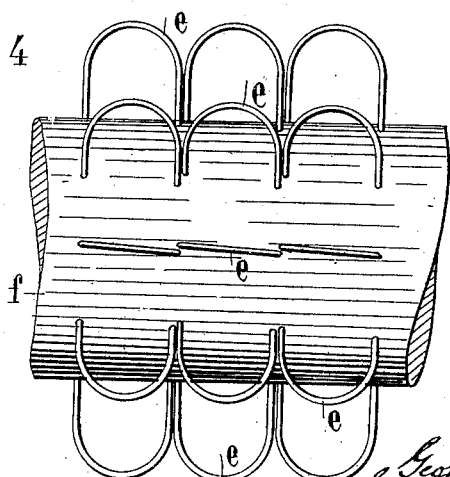
WITNESSES
J. Cook
M. D. Avidon
INVENTOR
Georges Erhard Marie
Guy Bernard Comte de
Salaberry
BY
Fowler Goepel
ATTORNEYS

G. E. M. GUY-BERNARD.
THRESHING MACHINE.
APPLICATION FILED MAY 13, 1909.

964,966.

Patented July 19, 1910.
2 SHEETS—SHEET 2.

UNITED STATES PATENT OFFICE.

GEORGES ERHARD MARIE GUY-BERNARD, OF FOSSÉ, FRANCE.

THRESHING-MACHINE.

964,966.

Specification of Letters Patent. Patented July 19, 1910.

Application filed May 13, 1909. Serial No. 495,765.

*To all whom it may concern:*

Be it known that I, GEORGES ERHARD MARIE GUY-BERNARD, Comte de Salaberry, a citizen of the Republic of France, and resident of Fossé, Loir-et-Cher, France, have invented a new and useful Improvement in Threshing-Machines, which improvement is fully set forth in the following specification.

This invention relates to combined grain cutters and separators, and has for its main object to provide in a machine of this kind novel means which will separate the grain from the stalks or straw immediately after the straw is cut, and to convey the grain and husks to a suitable receptacle. This object is accomplished by providing a comb between the teeth of which the stalks of the grain pass as they are being cut, and means for grasping the lower end of the stalks and pulling them downwardly, thus drawing the head of the grain through the comb and leaving grain and husks upon the comb to be conveyed off to a suitable receptacle.

Other objects are to provide additional devices to aid in the operation of the above mentioned mechanism, all of which will appear hereinafter.

It is evident that this machine may be used for gathering and separating wheat, oats and all similar cereals, but in this specification the application to the harvesting of wheat will be assumed.

Figure 2:
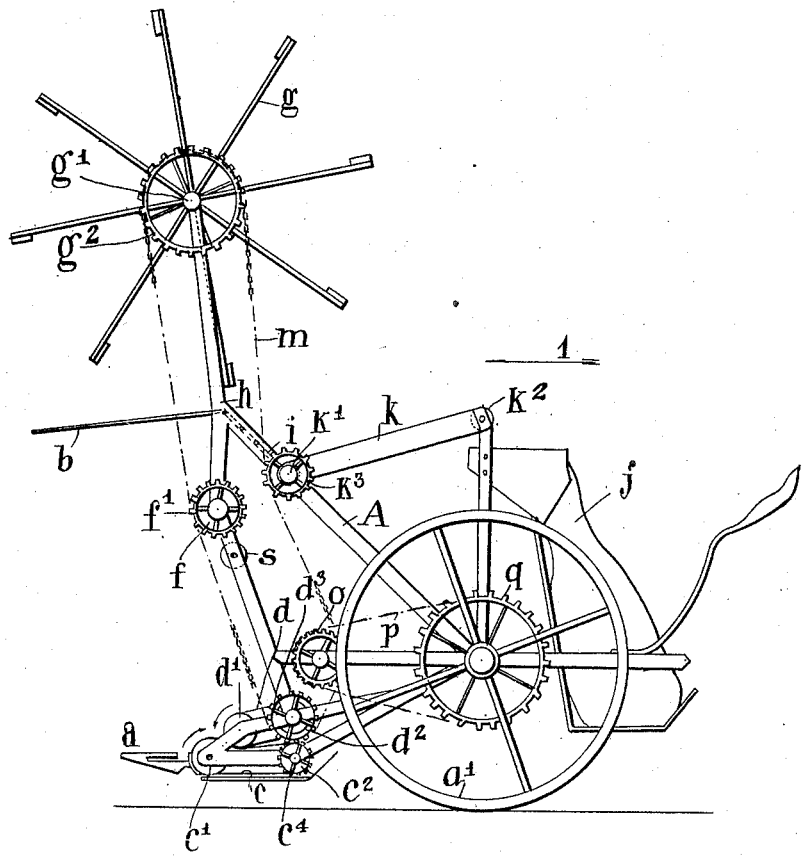
Figure 3:
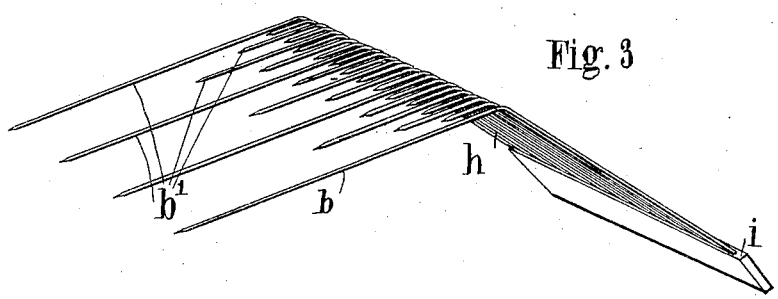

In the accompanying drawing, forming a part of this specification, which shows by way of example an embodiment of the invention, Figure 1 is a front-elevation of the machine, Fig. 2 is a side-view of the same, Fig. 3 is a detail perspective view of the comb across which the heads of the grain are drawn, and Fig. 4 is a front-elevation of the revolving shaft which assists in the separation of the grain.

Similar reference characters refer to similar parts through the several views.

As shown, the machine is provided with a frame A supported on wheels $a'$ and carrying the cutting elements or cutters $a$. These parts may be of any desired or ordinary construction, operated in any usual manner, and are therefore not described in detail.

At a convenient height above the cutters is disposed a comb $b$ having angular prongs or teeth $b'$ of regularly varied length. These teeth are spaced equal distances apart, but certain of them terminate to the rear of the points of others, thus leaving a greater distance between the adjacent forward ends of the longer teeth than the distance between the adjacent rear ends. The forward portions of the teeth lie nearly horizontally but the teeth are bent intermediately as at $h$ and the rear portions incline sharply to the rear and are secured in the crosspiece $i$ secured to the frame A. These teeth are placed at a height which adapts them to catch the stalks of the grain between them just below the head of the grain as the machine advances onto the grain in the direction of the arrow $l$.

Immediately to the rear of the cutters $a$ are provided lower and upper endless aprons $c$ and $d$ supported respectively on revolving drums $c'$ $c^2$ and $d'$ $d^2$. The aprons move in opposite directions and grasp between them the lower ends of the stalks of the wheat, thus drawing the heads of the wheat between the teeth of the comb $b$ and stripping the stalk of the grains of wheat and permitting said grains to fall back upon the endless apron $k$, the top-portion of which moves to the rear and transports the grains of wheat into the receptacle $j$ supported on the frame A. The apron $k$ is supported in revolving drums $k'$ and $k^2$.

In order to force the heads of the grain well to the rear that they may be efficiently engaged between the teeth of the comb, revolving beaters $g$ are provided mounted on a shaft $g'$ carried by the frame A and rotated by the pulley $g^2$. The pulley $g^2$ is revolved by the endless band $m$ passing around the pulley $n$ rotatably connected with the pulley $o$ in turn connected by the band $p$ with the pulley $q$ carried by one of the wheels $a'$. This band $m$ also engages and revolves the pulley $k^3$ of the drum $k^2$; the pulley $d^3$ of the drum $d^2$; and the pulley $f'$ of the cylinder $f$ presently to be described.

The drum $c^2$ is provided with a gear or friction wheel $c^4$ adapted to engage a similar wheel $d^4$ (see Fig. 1) rotatably connected with the drum $d^2$.

The operating mechanism of the cutters $a$ may be of any usual type and is not here shown.

In order to further facilitate the positive drawing of the stalk and the head of grain through the comb $b$, additional pulling means are provided below the comb $b$. This means comprises the aforementioned revolving cylinder $f$ having mounted thereon longitudinally arranged spaced rows of radially disposed overlapping wickets or bows $e$. As the cylinder $f$ revolves the stalks of the grain are caught between different adjacent bows and are thus drawn downwardly, the bows engaging the stalks moving downwardly since the cylinder revolves in a direction which is anticlockwise on Fig. 2; consequently the traction effect exercised by drum $f$ is added to that exercised by the aprons $c$ and $d$.

The bows $e$ are arranged on the cylinder $f$ in a longitudinal series of any number and may be formed either by flat spring-plates or by round galvanized or ungalvanized wires. In the former case the bows of two consecutive longitudinal rows should be placed slightly overlapping so as to present a zigzag path to the stalks, thereby facilitating the firm grasping of the stalks by the bows. The bows are arranged slightly obliquely to the length of the rows, as shown in Fig. 4. In order to prevent the winding of the stalks about the cylinder $f$, an additional roller $s$ is rotatably mounted below the same.

Since on account of the action of the beaters $g$ the separation of the grain takes place well back on the inclined part of the teeth of the comb, it is clear that the apron $k$ might be omitted entirely and the grains received directly in a sack placed under the cross-bar $i$. It is clear that the comb $b$ can be adapted for the separation of various kinds of grain and the teeth are not necessarily shaped as they are shown. It is also practicable to operate the machine without cutters, the grains being stripped from the stalk without cutting.

Having thus described my invention, I claim as new and desire to secure by Letters Patent:

1. In a threshing machine, the combination of a frame, a comb supported thereon and having teeth or prongs adapted to receive therebetween the stalks of grain, and means supported on said frame and movable relatively thereto and adapted to grasp the stalks and draw the heads thereof through said comb.

2. In a threshing machine, the combination of a frame, a comb supported thereon and having teeth through which the stalks of grain may be drawn to separate the grain therefrom, and an opposed pair of moving aprons mounted on said frame and adapted to move and grasp said stalks therebetween to draw said stalks through said comb.

3. In a threshing machine, the combination of a supporting frame, a comb supported thereon and having teeth through which the stalks of grain may be drawn to separate the grains therefrom, an opposed pair of moving aprons supported on said frame below said comb and adapted to move and grasp said stalks therebetween to draw said stalks through said comb, and a revolving cylinder below said comb and carrying bows adapted to grasp said stalks and exert additional pulling force thereon.

4. In a threshing machine, the combination of a supporting frame, a comb supported thereon and having teeth through which the stalks of grain may be drawn to separate the grain therefrom, an opposed pair of moving aprons supported on said frame and adapted to move and grasp said stalks therebetween to draw said stalks through said comb, a revolving cylinder below said comb and carrying bows adapted to grasp said stalks and exert additional pulling force thereon, and revolving beaters adapted to force said grain back upon said comb.

5. In a threshing machine, the combination of a supporting frame, a comb supported thereon and having teeth through which the stalks of grain may be drawn to separate the grain therefrom, an opposed pair of moving aprons arranged below said comb and adapted to move and grasp said stalks therebetween to draw said stalks through said comb, a receptacle for said grain, and revolving beaters adapted to force the grain to the rear part of said comb.

6. In a threshing machine, the combination of a pair of opposed movable aprons, a comb of angular profile above said aprons, a rotatable cylinder supported beneath said comb, rows of overlapping bows on said cylinder, revoluble beaters above said comb, a receptacle at the rear of said comb, an endless apron between said comb and receptacle, a frame supporting all of the above-named parts, and means for operating said aprons, cylinder and beaters.

7. In a threshing machine, the combination of a supporting frame, a comb, rotating beaters above the comb for moving the head of the cereal toward the inner side of the comb, two endless aprons moving in opposite directions for grasping the lower end of the straws to draw the heads thereof across the comb, revolving bows for completing the separation of the grain as the straws are drawn downwardly by the endless cloths, and a receptacle for the grain.

8. In a threshing machine, the combination of a frame, a comb, moving endless aprons between which the straws are grasped for drawing the heads of grain across the comb, and a receptacle for the grain.

9. In a threshing machine, the combination of a frame, a comb, moving endless aprons for drawing the heads of the grain across the comb, beating means at the top of the comb, and a receptacle for the grain.

In testimony whereof I have signed this specification in the presence of two subscribing witnesses.

GEORGES ERHARD MARIE GUY-BERNARD.

Witnesses:
EMILE LEDRET,
DEAN B. MASON.